United States Patent
Lin

(10) Patent No.: US 6,923,277 B2
(45) Date of Patent: Aug. 2, 2005

(54) SOLAR-POWERED TRANSMISSION DEVICE

(76) Inventor: Wen-Pin Lin, No. 30, Chien-Yung St., Tung Dist., Taichung City (TW)

( * ) Notice: Subject to any disclaimer, the term of this patent is extended or adjusted under 35 U.S.C. 154(b) by 164 days.

(21) Appl. No.: 10/391,355

(22) Filed: Mar. 17, 2003

(65) Prior Publication Data

US 2004/0182613 A1 Sep. 23, 2004

(51) Int. Cl.[7] .......................... B60K 16/00; B60L 8/00; A63H 29/22; A63H 33/04
(52) U.S. Cl. ...................... 180/2.2; 180/65.6; 446/90; 446/91; 446/484
(58) Field of Search ........................ 180/2.1, 2.2, 65.1; 446/164, 175, 163, 462, 484

(56) References Cited

U.S. PATENT DOCUMENTS

| | | | | |
|---|---|---|---|---|
| 3,971,454 A | * | 7/1976 | Waterbury | 180/65.8 |
| 4,141,178 A | * | 2/1979 | McGraw | 446/210 |
| 4,181,188 A | * | 1/1980 | Dessert | 180/2.2 |
| RE31,156 E | * | 2/1983 | Dessert | 180/2.2 |
| 4,869,332 A | * | 9/1989 | Fujita et al. | 180/65.2 |
| 5,145,442 A | * | 9/1992 | Zan | 446/163 |
| 5,581,136 A | * | 12/1996 | Li | 310/67 R |
| 5,603,555 A | * | 2/1997 | Dickey et al. | 301/111.05 |
| 6,502,656 B2 | * | 1/2003 | Weiss et al. | 180/168 |
| 6,585,553 B1 | * | 7/2003 | Fetridge et al. | 446/91 |
| 6,705,917 B2 | * | 3/2004 | Filo | 446/379 |

* cited by examiner

*Primary Examiner*—Christopher P. Ellis
*Assistant Examiner*—Bridget Avery
(74) *Attorney, Agent, or Firm*—DLA Piper Rudnick; Gray Cary US LLC

(57) ABSTRACT

A solar-powered transmission device includes a casing, a cover, a drive unit, and a solar collecting panel. The casing is formed with a hole unit. The cover cooperates with the casing so as to confine a component receiving space, and has a transparent portion that permits entry of light into the component receiving space. The drive unit is mounted in the component receiving space, and includes a motor, a speed-reduction gear set coupled to and driven rotatably by the motor, and an output shaft unit coupled to and driven rotatably by the speed-reduction gear set. The output shaft unit extends through the hole unit in the casing. The solar collecting panel is disposed in the component receiving space and is coupled electrically to the motor.

10 Claims, 5 Drawing Sheets

SOLAR-POWERED TRANSMISSION DEVICE

BACKGROUND OF THE INVENTION

1. Field of the Invention

The invention relates to a transmission device, more particularly to a solar-powered transmission device for toys.

2. Description of the Related Art

A conventional toy car usually relies on batteries for providing driving power. To maintain adequate driving power, batteries need to be frequently replaced, which incurs a lot of expense for consumers.

To save costs and minimize inconvenience attributed to frequent battery replacement, it has been proposed heretofore to utilize solar energy for driving a toy car.

As shown in FIG. 1, a conventional solar-powered toy car includes a car body 1, a support rod 2 extending upwardly from a roof of the car body 1, a solar collecting panel 3 mounted on top of the support rod 2, and a cable 4 having one end connected to the solar collecting panel 3 and the other end connected to a motor (not shown) in the car body 1 to establish electrical connection therebetween.

When the solar collecting panel 3 collects sufficient energy, the motor is operable to drive the toy car. Although the solar-powered toy car saves costs and avoids frequency battery replacement, there are still some drawbacks in practice:

1. Since the solar collecting panel 3 is exposed and has no surrounding protection, it is easily damaged in the event of a collision. Moreover, because the cable 4 is exposed, it is liable to be torn off or broken, which can render the aforesaid toy car useless.
2. The aforesaid toy car does not incorporate a speed reduction function, which results in relatively high power consumption.

SUMMARY OF THE INVENTION

Therefore, the object of the present invention is to provide a solar-powered transmission device that can overcome the aforesaid drawbacks associated with the prior art.

Accordingly, a solar-powered transmission device of this invention comprises:

a casing including a base wall and a side wall that extends in a first direction from a periphery of the base wall and that is formed with a hole unit having a hole axis which extends in a second direction transverse to the first direction;

a cover mounted on the side wall opposite to the base wall and cooperating with the casing so as to confine a component receiving space, the cover having a transparent portion that permits entry of light into the component receiving space;

a drive unit mounted in the component receiving space and including
  a motor having a motor axle,
  a speed-reduction gear set coupled to and driven rotatably by the motor axle, and
  an output shaft unit extending in the second direction through the hole unit, and coupled to and driven rotatably by the speed-reduction gear set; and a solar collecting panel disposed in the component receiving space and coupled electrically to the motor, the solar collecting panel being capable of supplying electrical power to the motor in response to the light admitted into the component receiving space through the transparent portion of the cover.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
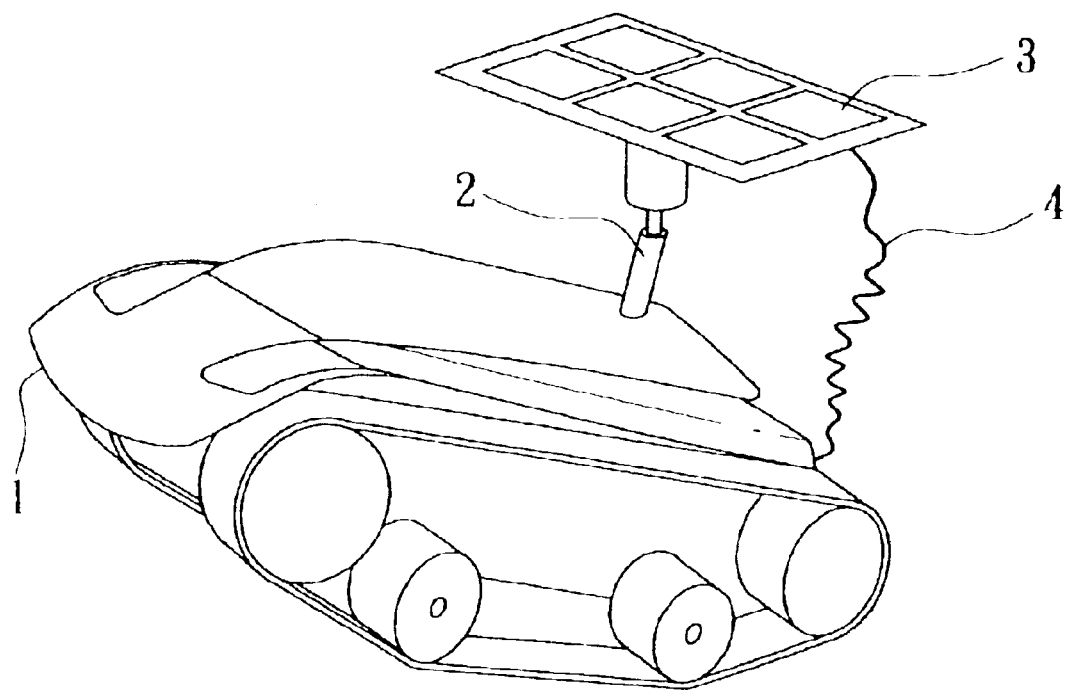
FIG. 1 is a perspective view illustrating a conventional solar-powered toy car.
Figure 2:
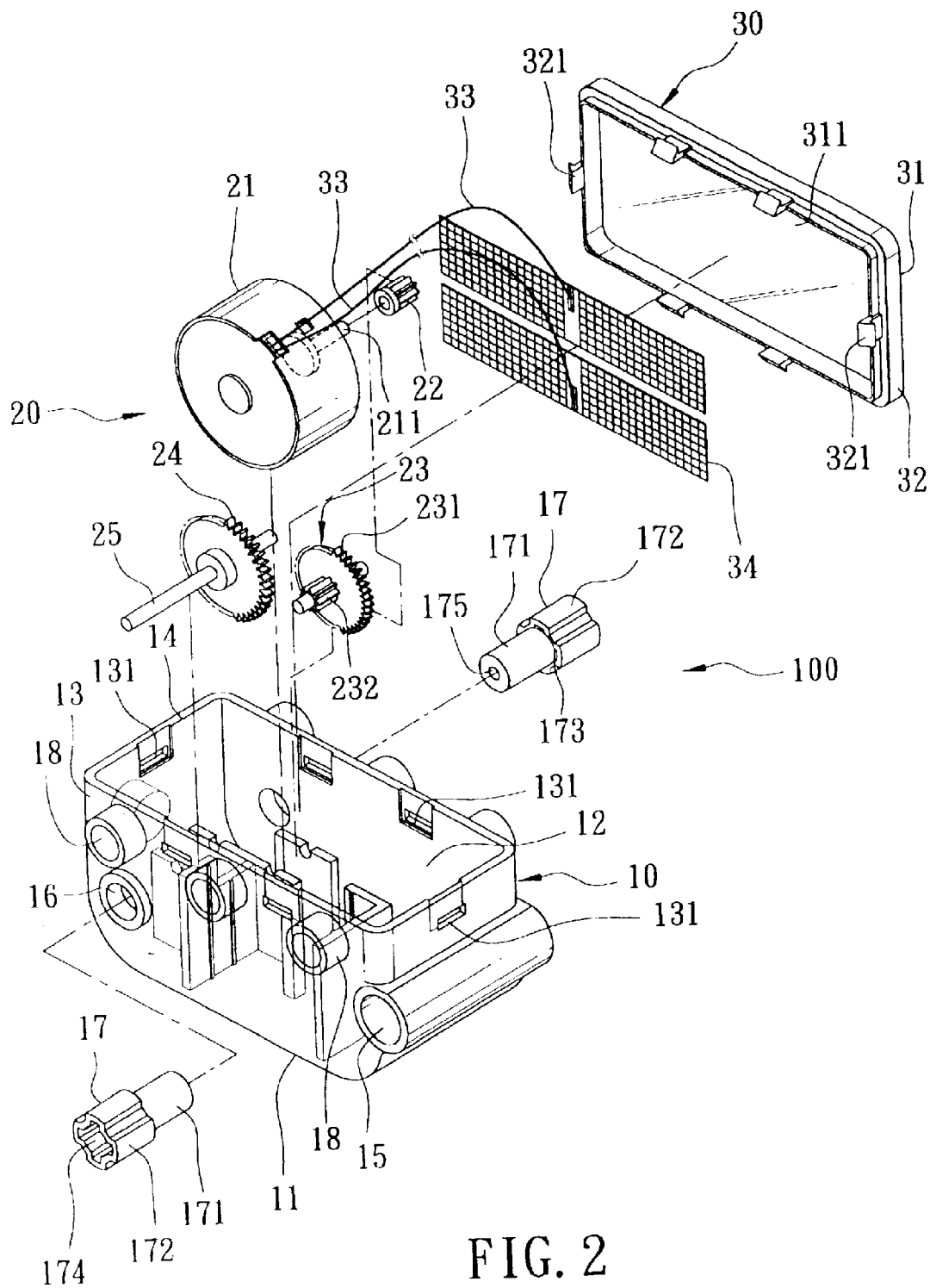
FIG. 2 is an exploded perspective of the preferred embodiment of a solar-powered transmission device according to the present invention.
Figure 3:
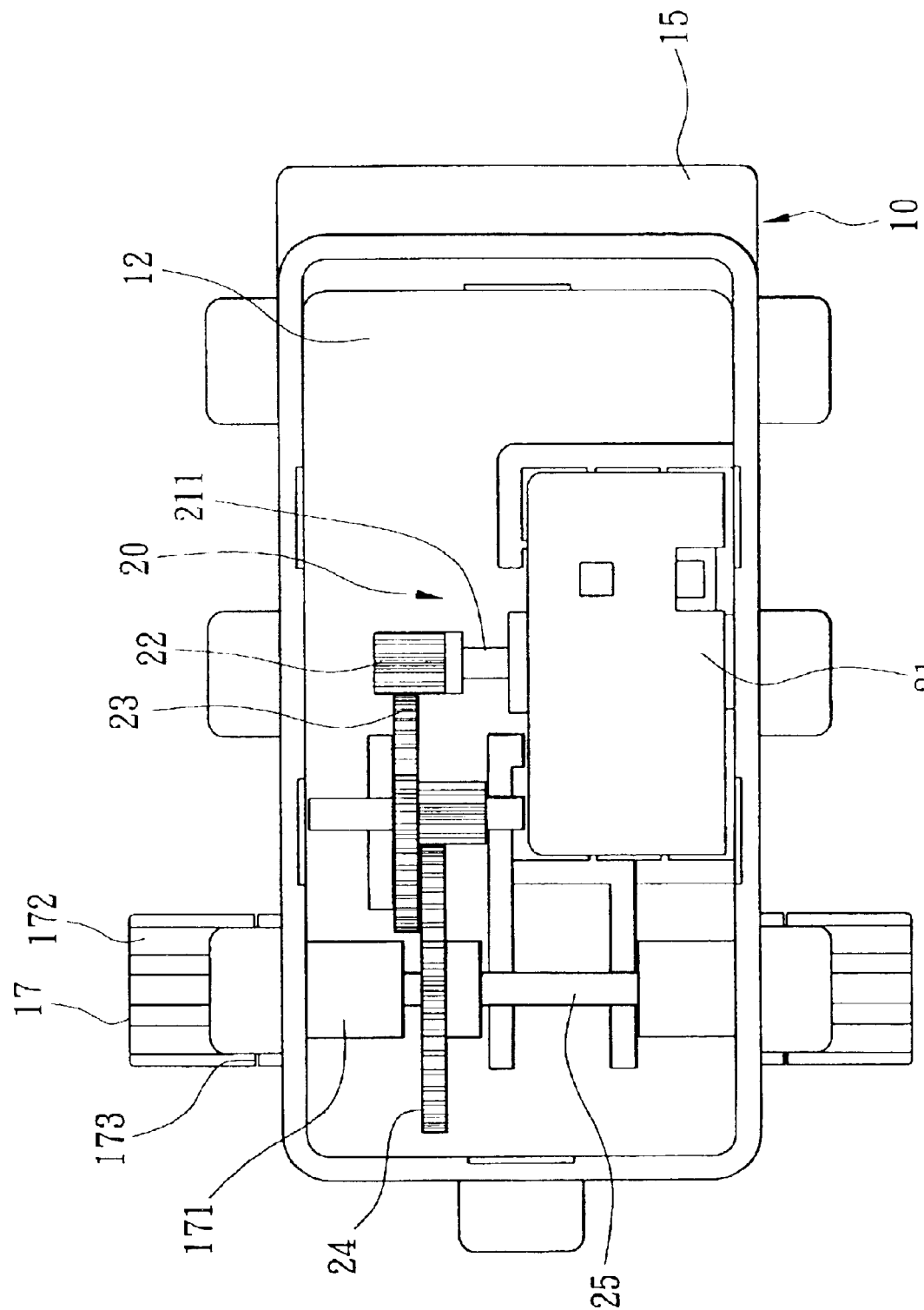
FIG. 3 is a schematic top view illustrating a casing and a drive unit of the preferred embodiment.

Referring to FIGS. 2 and 3, the preferred embodiment of a solar-powered transmission device 100 according to the present invention is shown to comprise a casing 10, a cover 30, a drive unit 20, and a solar collecting panel 34.

The casing 10 includes a base wall 11 and a side wall 13 that extends in a first direction from a periphery of the base wall 11 and that is formed with a hole unit having a hole axis which extends in a second direction transverse to the first direction. In this embodiment, the hole unit includes a pair of holes 16 formed in the side wall 13 and opposite to each other along the hole axis.

The cover 30 is mounted on a top portion 14 of the side wall 13 opposite to the base wall 11, and cooperates with the casing 10 so as to confine a component receiving space 12. The cover 30 has a transparent portion 311 that permits entry of light into the component receiving space 12. In this embodiment, the cover 30 is made entirely from a light transmissive material, and includes a planar part 31 that is formed with the transparent portion 311, and a peripheral part 32 that extends in the first direction from a periphery of the planar part 31 and that cooperates with the planar part 31 so as to confine a panel receiving portion of the component receiving space 12.

Preferably, the side wall 13 of the casing 10 and the peripheral part 32 of the cover 30 are formed with a hook-and-groove unit for mounting removably the cover 30 on the casing 10. The hook-and-groove unit includes a set of resilient hooks 321 formed on the peripheral part 32 of the cover 30, and a set of engaging grooves 131 formed in the top portion 14 of the side wall 13 of the casing 10 to engage the resilient hooks 321, respectively.

The drive unit 20 is mounted in the component receiving space 12, and includes a motor 21 having a motor axle 211, a speed-reduction gear set coupled to and driven rotatably by the motor axle 211, and an output shaft unit extending in the second direction through the hole unit in the side wall 13 of the casing 10, and coupled to and driven rotatably by the speed-reduction gear set.

In this embodiment, the speed-reduction gear set includes a drive gear 22 mounted on the motor axle 211, a gear unit 23 having a large-diameter section 231 meshing with the drive gear 22, and a small-diameter section 232, and an output gear 24 meshing with the small-diameter section 232 of the gear unit 23. The drive gear 22 is smaller than the large-diameter section 231, and the small-diameter section 232 is smaller than the output gear 24, thereby resulting in a speed-reduction effect.

The output shaft unit includes a pair of coupling sleeves 17 and a driven axle 25. Each of the coupling sleeves 17 has an outer coupling portion 172 disposed outwardly of the casing 10, and an inner coupling portion 171 extending rotatably into the component receiving space 12 through a respective one of the holes 16. The inner coupling portion 171 is formed with an axle hole 175. The outer coupling portion 172 is formed with a cross-shaped insert bore 174, and has a cross-section larger than the inner coupling portion 171 so as to form a shoulder 173 that abuts against the side wall 13 of the casing 10. The driven axle 25 has opposite ends inserted fixedly and respectively into the axle holes 175 in the inner coupling portions 171 of the coupling sleeves 17 to connect therewith. The output gear 24 is mounted on the driven axle 25 so that the driven axle 25 is coupled to and driven rotatably by the speed-reduction gear set.

The solar collecting panel 34 is disposed in the component receiving space 12 and is coupled electrically to the motor 21 by means of cables 33. The solar collecting panel 34 is capable of supplying electrical power to the motor 21 in response to the light admitted into the component receiving space 12 through the transparent portion 311 of the cover 30. In this embodiment, the solar collecting panel 34 is disposed in the panel receiving portion of the component receiving space 12, and is secured to an inner face of the planar part 31 of the cover 30.

Accordingly, when the solar collecting panel 34 collects admitted light from the sun or from a light bulb and converts the same into electrical energy, and when the converted energy reaches a minimum wattage, such as 60 watts, the motor 21 operates due to the connection with the solar connecting panel 34 via the cables 33. The motor axle 211 rotates the drive gear 22, and the drive gear 22 drives the gear unit 23 to transmit power to the output gear 24. Rotation of the output gear 24 is finally transmitted to the coupling sleeves 17 via the driven axle 25.

Figure 4:
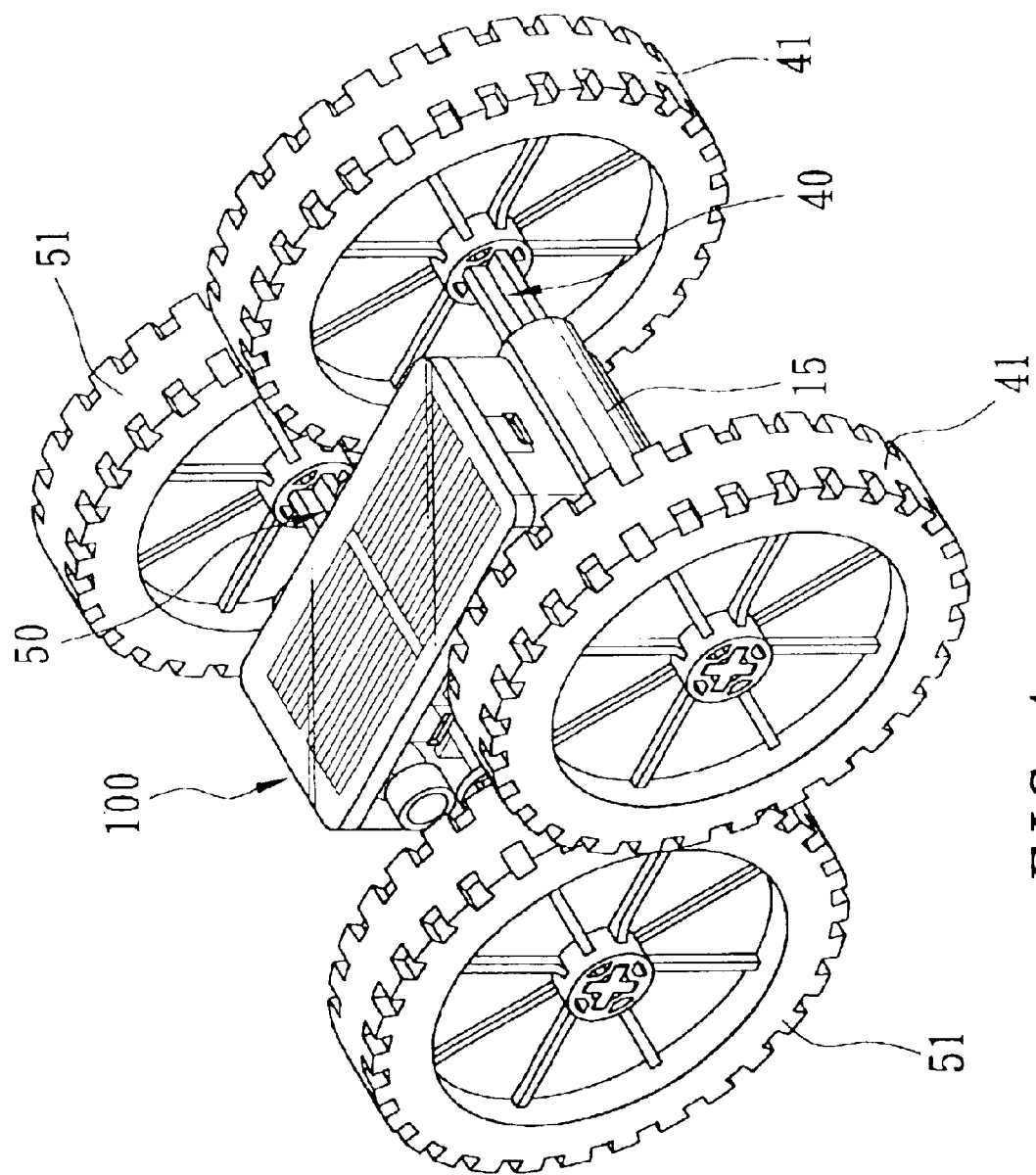
FIG. 4 is a perspective view of a toy car that incorporates the preferred embodiment of the solar-powered transmission device according to the present invention.

The side wall 13 of the casing 10 is further formed with an axle mounting tube 15 that extends parallel to the hole axis of the hole unit and that is spaced apart from the hole unit in a third direction transverse to the first and second directions. With further reference to FIG. 4, a front wheel axle 40 can be extended through the axle mounting tube 15, and a pair of front wheels 41 can be secured to opposite ends of the front wheel axle 40 to constitute a front wheel unit of a toy car. Afterwards, a pair of rear wheel axles 50 can be inserted into the outer coupling portions 172 of the coupling sleeves 17, respectively, and a pair of rear wheels 51 can be secured to the rear wheel axles 50, respectively, to constitute a rear wheel unit of the toy car. As such, with reference to FIG. 3, advancing movement of the toy car results when the coupling sleeves 17 are driven to rotate in the manner described hereinabove.

Figure 5:
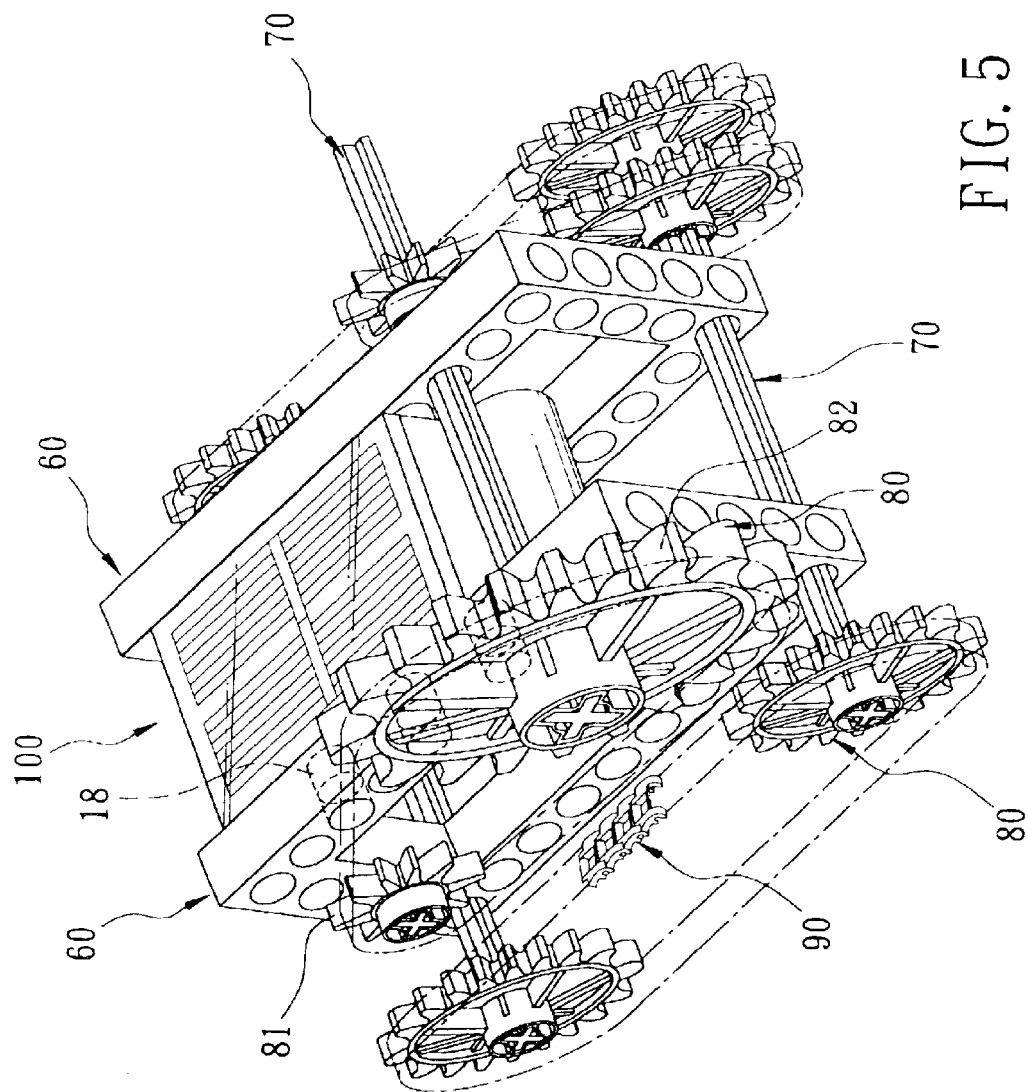
FIG. 5 is a perspective view of a toy tank that is built from building blocks and that incorporates the preferred embodiment of the solar-powered transmission device according to the present invention.

In the preferred embodiment, the base wall 11 and the side wall 13 of the casing 10 have outer surfaces formed with a set of block engaging members 18. As shown in FIG. 5, the block engaging members 18 can be used to mount a pair of perforated rectangular building blocks 60 on the casing 10. A small gear 81 on one of the building blocks 60 can be coupled to the driven axle 25 (refer to FIG. 3) so as to be driven rotatably thereby. A plurality of shafts 70 can be extended between the building blocks 60. A set of sprockets 80 with teeth 82 can be mounted on respective ends of the shafts 70, and a set of chains 90 can be employed to interconnect adjacent ones of the sprockets 80 so as to form a toy tank. As such, advancing movement of the toy tank results when the driven axle 25 is driven to rotate in the manner described hereinabove.

In sum, the solar-powered transmission device 100 of this invention has the following advantages:

1. In the event of a collision, the solar collecting panel 34, the drive unit 20 and the cables 33 can be protected from damage by the casing 10 and the cover 30.
2. The inclusion of the speed-reduction gear set in the drive unit 20 can result in lower power consumption.
3. The solar-powered transmission device 100 can be used with building blocks to form various toy assemblies.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A solar-powered transmission device, comprising:
   a casing including a base wall and a side wall that extends in a first direction from a periphery of said base wall and that is formed with a hole unit having a hole axis which extends in a second direction transverse to the first direction;
   a cover mounted on said side wall opposite to said base wall and cooperating with said casing so as to confine a component receiving space, said cover having a transparent portion that permits entry of light into said component receiving space, wherein said cover includes a planar part and a peripheral part extending in the first direction from a periphery of said planar part and cooperating with said planar part so as to confine a panel receiving portion of said component receiving space, said planar part being formed with said transparent portion, said solar collecting panel being disposed in said panel receiving portion and wherein said side wall of said casing and said peripheral part of said cover are formed with a hook-and-groove unit for mounting removably said cover on said casing;
   a drive unit mounted in said component receiving space and including
      a motor having a motor axle,
      a speed-reduction gear set coupled to and driven rotatably by said motor axle, and
      an output shaft unit extending in the second direction through said hole unit, and coupled to and driven rotatably by said speed-reduction gear set; and
   a solar collecting panel disposed in said component receiving space and coupled electrically to said motor, said solar collecting panel being capable of supplying electrical power to said motor in response to the light admitted into said component receiving space through said transparent portion of said cover.

2. The solar-powered transmission device as claimed in claim 1, wherein said cover is made entirely from a light transmissive material.

3. The solar-powered transmission device as claimed in claim 1, wherein said solar collecting panel is secured to said planar part of said cover.

4. The solar-powered transmission device as claimed in claim 1, wherein said hook-and-groove unit includes a set of resilient hooks formed on said peripheral part of said cover, and a set of engaging grooves formed in said side wall of said casing to engage said resilient hooks, respectively.

5. The solar-powered transmission device as claimed in claim 1, wherein said speed-reduction gear set includes:
   a drive gear mounted on said motor axle;
   a gear unit having a large-diameter section meshing with said drive gear, and a small-diameter section; and
   an output gear mounted on said output shaft unit and meshing with said small-diameter section of said gear unit.

6. The solar-powered transmission device as claimed in claim 1, wherein said hole unit includes a pair of holes formed in said side wall and opposite to each other along the hole axis, said output shaft unit including
   a pair of coupling sleeves, each of which has an outer coupling portion disposed outwardly of said casing, and an inner coupling portion extending rotatably into said component receiving space through a respective one of said holes, and
   a driven axle having opposite ends connected respectively to said inner coupling portions of said coupling sleeves, said driven axle being coupled to and driven rotatably by said speed-reduction gear set.

7. The solar-powered transmission device as claimed in claim 1, wherein said side wall is further formed with an axle mounting tube that extends parallel to the hole axis of said hole unit and that is spaced apart from said hole unit in a third direction transverse to the first and second directions.

8. The solar-powered transmission device as claimed in claim 6, wherein said outer coupling portion has a cross-section larger than said inner coupling portion so as to form a shoulder that abuts against said side wall of said casing.

9. The solar-powered transmission device as claimed in claim 6, wherein said outer coupling portion is formed with a cross-shaped insert bore.

10. A solar-powered transmission device, comprising:
   a casing including a base wall and a side wall that extends in a first direction from a periphery of said base wall and that is formed with a hole unit having a hole axis which extends in a second direction transverse to the first direction, wherein said base wall and said side wall have outer surfaces formed with a set of block engaging members;
   a cover mounted on said side wall opposite to said base wall and cooperating with said casing so as to confine a component receiving space, said cover having a transparent portion that permits entry of light into said component receiving space;
   a drive unit mounted in said component receiving space and including
      a motor having a motor axle,
      a speed-reduction gear set coupled to and driven rotatably by said motor axle, and
      an output shaft unit extending in the second direction through said hole unit, and coupled to and driven rotatably by said speed-reduction gear set; and
   a solar collecting panel disposed in said component receiving space and coupled electrically to said motor, said solar collecting panel being capable of supplying electrical power to said motor in response to the light admitted into said component receiving space through said transparent portion of said cover.

* * * * *